UNITED STATES PATENT OFFICE.

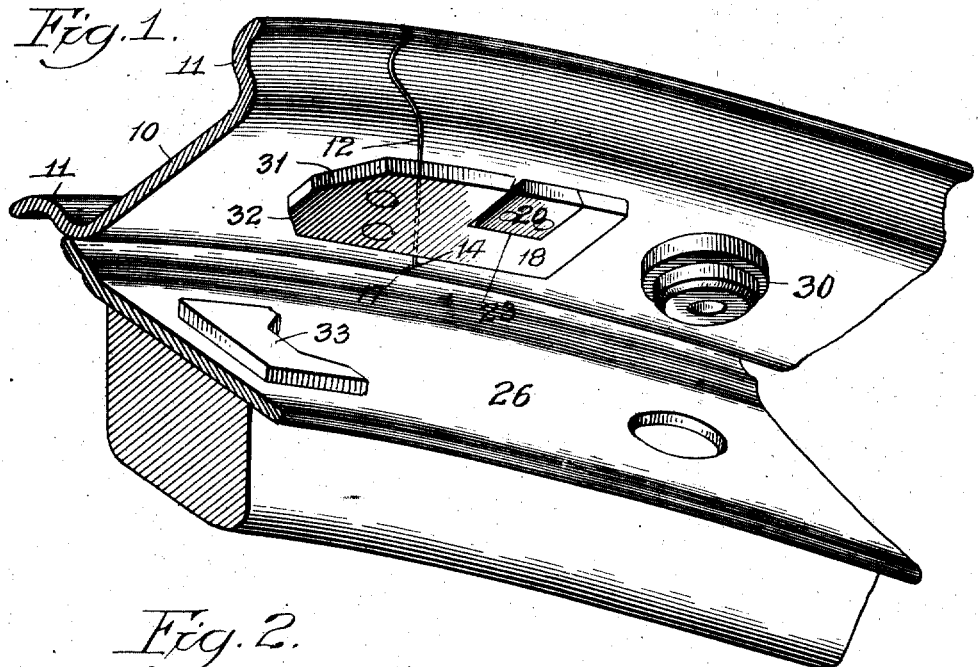
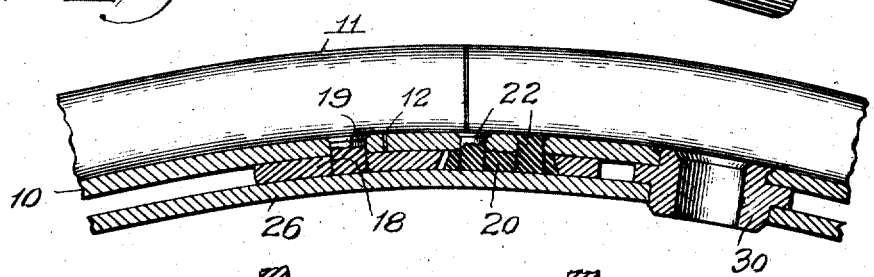
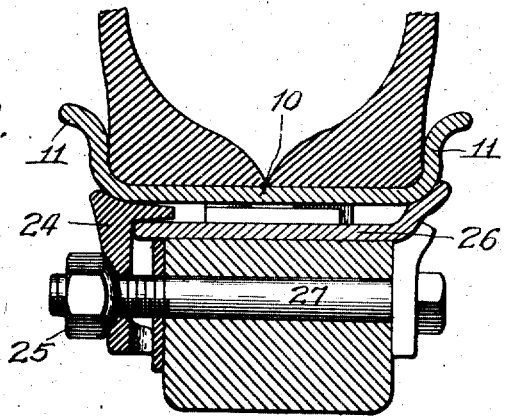

OTIS W. MOTT, OF JACKSON, MICHIGAN, ASSIGNOR OF ONE-HALF TO JACKSON RIM COMPANY, OF JACKSON, MICHIGAN, A CORPORATION OF MICHIGAN, AND ONE-HALF TO DETROIT DEMOUNTABLE RIM CO., OF DETROIT, MICHIGAN, A CORPORATION OF MICHIGAN.

DEMOUNTABLE RIM.

1,248,887.  Specification of Letters Patent.  Patented Dec. 4, 1917.

Application filed December 17, 1915. Serial No. 67,304.

*To all whom it may concern:*

Be it known that I, OTIS W. MOTT, a citizen of the United States, and a resident of Jackson, in the county of Jackson and State of Michigan, have invented certain new and useful Improvements in Demountable Rims, of which the following is a full, clear, and exact description.

The invention relates to demountable rims for pneumatic tires, and more particularly to locking devices employed for securing together the ends of a transversely split rim.

One object of the invention is to provide a locking device which is simple in construction, efficient in operation, and which can be produced at a low cost.

A further object of the invention is to provide an improved locking device which is disposed entirely between the tire rim and the felly band of the wheel, which comprises members rigidly on the rim ends respectively, and in which provision is made for interlocking the rim ends against relative radial movement.

The invention consists in the several novel features of construction hereinafter set forth and more particularly defined by claims at the conclusion hereof.

In the drawings: Figure 1 is a perspective of the inner face of a portion of a rim and felly band, embodying the invention. Fig. 2 is a longitudinal section of the rim in operative position upon a portion of the wheel. Fig. 3 is a transverse section taken at a point where the rim is secured on the wheel by a wedge-lug.

The rim is formed of a band 10 adapted to fit around a wheel-body, and to be secured thereon by wedges and bolts in a manner well understood in the art. This band is provided with integral tire-engaging flanges 11 which may be formed to fit any of the well known forms of pneumatic tires. To facilitate placement of the rim within the tire, and the removal therefrom, the rim is transversely split at one point to permit inward and lateral flexing of one end of the rim away from the tire, and this split is formed by a diagonal cut 12 extending partially across the rim to a point 14 and thence substantially at a right angle to the side of the rim, as at 17, forming in effect, an obtuse angular transverse split in the rim.

The improved locking device comprises a plate 18 which is rigidly secured to the inner face of one end of the rim by rivets 19, extending through the base of the band 10 and a rectangular plate or lug 20 which is rigidly secured to the inner face of the other end of band 10 by rivets 22, which may be integral with said plate and extend through said band. Plate 18 is secured to the inner face of one end portion of the base of the band 10 and projects longitudinally therefrom across the split to underlie the other end portion of the band, and is formed in one of its sides with an opening, or recess 23 adapted to extend around the ends and one side of the plate 20. The ends of plate 20 are dovetailed or divergent from the band and the edges of recess 23 are correspondingly inclined and divergent to form an interlocking connection between the rim ends whereby, when the lock members are in engagement, the rim ends will be secured against relative radial movement.

In practice, the recess 23 is slightly longer than the plate 20, so that there will be a slight lost motion or longitudinal play between the plates of the interlocking device. This play is sufficient to permit the plates to be separated by relative lateral movement when the rim is not subjected to contracting pressure of the tire or to the expanding pressure of the lugs for securing the rim to a wheel. When the rim has been placed within a tire, and the tire is inflated, the rim is usually contracted by the tire sufficiently to force the two contiguous edges of plate 20 and recess 23 nearest the split into radially interlocking engagement, as a result of the contracting pressure of the rim, so that when the rim is being carried with an inflated tire as a spare rim, the rim-ends will be held against relative radial movement by the interlock caused by the pressure of the tire.

When the rim is placed on a wheel and secured thereon by the usual wedge lugs 24 which extend between the felly band 26 of the wheel and the rim, and nuts 25 on bolts 27, the lugs exert an expanding pressure upon the split-rim which will cause the rim to expand slightly and bring the contiguous dovetailed edges of plate 20 and recess 23 farthest from the split into radially interlocking engagement. As a result, the locking device will serve to secure the rim ends against relative radial movement, both when the rim ends are subjected to contracting pressure of the tire and when the rim is subjected to expanding pressure by the wedge-lugs.

In placement of the rim in a tire, the rim end to which the plate 20 is secured is first placed in the tire, the remainder of the rim being sprung laterally and inwardly at such time to facilitate insertion of the rim end first placed around the tire. Next, the other end, when released, springs within the tire and, then the plate 18 will be guided laterally into position around the plate 20, so that the latter plate will enter and be disposed in opening 23 of plate 18.

The slight play between the plate facilitates this connection of the locking members. When the tire is inflated and is carried as a spare, the pressure in the tire will exert a contracting pressure upon the rim, so that the contiguous edges of plate 20 and recess 23 nearest the split will be forced into interlocking engagement, thus holding the rim ends against relative radial movement. When the rim is applied to a wheel for use on a vehicle, the wedge-bolts exert an expanding pressure upon the rim and tend to force the rim ends apart until the contiguous edges of plate 20 and recess 23 farthest from the split are forced into interlocking engagement. In such relation the locking device positively limits the expansion of the rim by the wedge-lugs and forms a radially interlocking connection to retain the rim ends longitudinally alined. As a result, any outward radial pressure exerted upon one rim end by one of the wedge-lugs will be transmitted to both rim ends through this dovetailed connection.

When the tire is deflated, there is no substantial contracting or expanding pressure upon the rim, so that one of the rim ends may be easily sprung inwardly and laterally to facilitate removal of the rim from the tire.

An opening is formed adjacent one of the rim ends and a hollow stud or rivet 31 is secured therein to receive the nipple containing the valve for the tire. One end of plate 18 is cut off at its corners, as at 31 and 32, to fit into a driving plate 33 which has one of its ends formed to receive the corresponding end of plate 18 and is secured to the felly band of the wheel.

The invention thus exemplifies an improved locking device for securing the ends of a split rim together, which is simple in construction and can be easily operated, and in which provision is made for radially interlocking the rim ends both when the rim is being carried as a spare, and when it is secured on a wheel.

The invention is not to be understood as restricted to the details set forth, since these may be modified within the scope of the appended claims, without departing from the spirit and scope of the invention.

Having thus described the invention, what I claim as new and desire to secure by Letters Patent is:

1. The combination with a transversely split tire-carrying rim, of a locking device for securing the rim-ends together, comprising plates fixed on the inner faces of the rim-ends respectively, one of said plates being formed with an opening to receive the other plate, said plates having interfitting contiguous edges for securing the rim-ends against relative radial movement.

2. The combination with a transversely split tire-carrying rim, of a locking device for securing the rim-ends together, comprising a pair of plates rigidly secured to the inner faces of the rim-ends respectively, one of said plates having an open sided slot for receiving the other plate, said plates having interfitting contiguous edges to secure the rim-ends against relative radial movement.

3. The combination with a transversely split tire-carrying rim, of a locking device for securing the rim-ends together, comprising plates, fixed on the inner faces of the rim-ends respectively, one of said plates being formed with an opening to receive the other plate, said plates having interfitting contiguous edges for securing the rim-ends against relative radial movement, said plates being separable by relative lateral movement.

4. The combination with a transversely split tire carrying-rim, of a locking device for securing the rim-ends together, comprising a pair of plates rigidly secured to the inner faces of the rim-ends, respectively, the edges of the opening and the plate therein being dovetailed to secure the rim ends against relative radial movement when the rim is expanded or contracted, the opening being formed to permit the plates to be separated by relative lateral movement.

OTIS W. MOTT.

Witnesses:
MILDRED STUMPF,
KATHARINE GERLACH.